Patented June 11, 1935

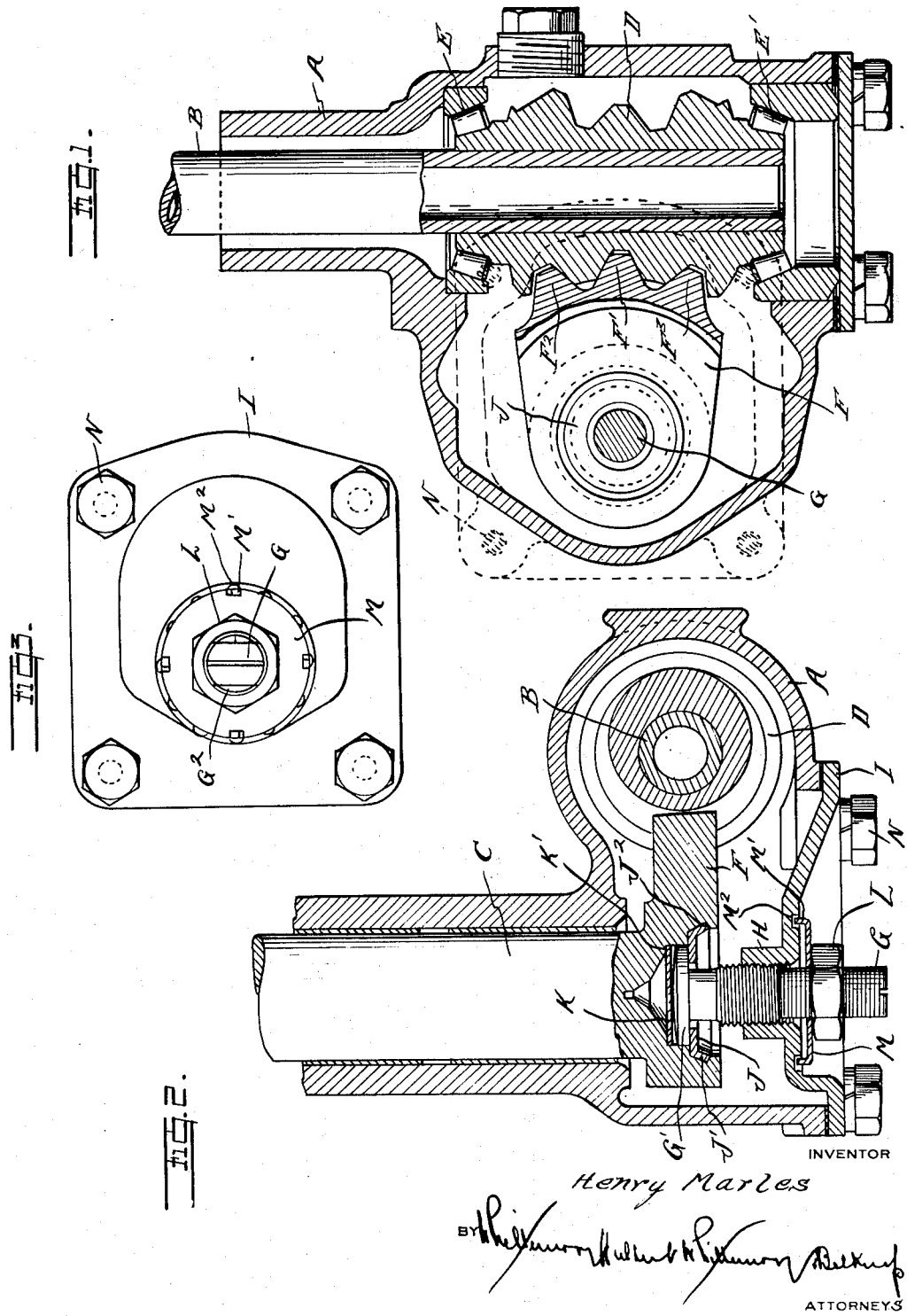

2,004,374

UNITED STATES PATENT OFFICE 2,004,374

STEERING GEAR

Henry Marles, Detroit, Mich., assignor to Gemmer Manufacturing Company, Detroit, Mich., a corporation of Michigan Application June 25, 1934, Serial No. 732,374

6 Claims. (Cl. 74—500)

The invention relates to steering gears and more particularly to the construction of the worm gearing which transmits movement from the steering stem to the rock shaft. It is the object of the invention to obtain a simple and inexpensive construction of gearing which can be easily adjusted to take up all lost motion and to compensate for wear and to this end the invention consists in the construction as hereinafter set forth.

In the drawing:

Fig. 1 is a vertical section through the gearing and its housing substantially in the plane of the steering stem;

Fig. 2 is a horizontal section therethrough.

Fig. 3 is a side elevation showing a portion of the cover plate and the adjustment means thereon for the end thrust bearing.

As illustrated, A is the housing for the worm gearing which connects the steering stem B to the rock shaft C. D is a worm mounted on the stem B and journaled on roller bearings E and E' in the casing A. F is a worm gear segment mounted on the rock shaft C in operative engagement with the worm D.

The worm gear segment F is not a true gear but is of the type in which all of the teeth may be simultaneously generated by the rectilinear movement of the cutter at a predetermined angle to the axis of the gear. There are preferably three straight-sided tapering teeth F', $F^2$, $F^3$, the center tooth F' in the central position of the gearing having both sides thereof in contact with co-operating surfaces of the worm while the other teeth $F^2$, $F^3$ have only their inner surfaces in contact with the worm with a clearance between the worm and their outer surfaces. Thus during the movement of the gearing this clearance will compensate for the irregularity in the gear due to the fact that the teeth have not been generated. It is usual with gear segments of this type to form the teeth by a movement of the cutter which is parallel to the axis of the gear. However, with the present construction I have modified these teeth by forming the same at a slight angle to the axis. This permits of taking up lost motion between the worm and gear by adjusting the latter axially and avoids the necessity of any lateral adjustment between the axes of the worm and gear.

To facilitate this axial adjustment I preferably employ a construction of adjustment means accessible from outside the gear housing and which is adapted to move the gear and rock shaft axially in either direction. As shown this adjustment means comprises a screw threaded rod G engaging a correspondingly threaded bearing H in a cover plate I for the housing A. The rod G and rock shaft C are coaxial and the end of the rod is provided with an enlarged head G' having a rounded outer face. The gear segment F is recessed to receive the head G' and the head is retained in this recess by a collar J bearing against the opposite face thereof. The collar J is fixed in position, preferably by providing it with a flange J' which is expanded into an annular groove in the walls of the recess to be locked therein. There is also a resilient plate K placed in the recess having its peripheral portion in contact with a shoulder at K' and the central portion bearing against the rounded end of the head G'. Thus the slight flexing of this plate will provide a resilient element in the adjustment means. The rod G is locked in any desired position of adjustment by a nut L which engages the threaded portion thereof and bears against a dished resilient washer M abutting against the cover plate I. The sides of the rod G are cut away or flattened at $G^2$ to engage a correspondingly shaped aperture in the washer and which prevents rotation thereof. The washer M is also provided with a plurality of inwardly extending points M' engaging notches $M^2$ in the cover plate I so that by turning the washer to advance the points thereof from one notch to another, an adjustment can be made that is less than the length of a single thread.

In assembling the structure above described, the resilient plate K is first inserted in the recess in the gear member F. The rod G is then placed with its head G' against said plate, the collar J is next inserted in the recess and its flange J' is then expanded into the groove so as to lock against the shoulder $J^2$. The rock shaft C may then be inserted in the casing A and the cover plate I is screwed on to the threaded portion of the rod G and secured to the housing by suitable means such as bolts N. Before inserting the rock shaft C and gear F the worm D on the steering stem B is inserted in the housing A and positioned by the roller bearings E. Also the proportion of parts is such that in the initial assembly the gear F contacts with the worm in a radial plane of the latter which is substantially perpendicular to the longitudinal inclination of the gear teeth. Thus by screwing the rod G inward or outward, adjustment may be made where all lost motion between the gears is taken up. The parts are then locked in this position by tightening the nut L against the dished resilient plate M which acts as a nut lock. Whenever through wear or other cause there is lost motion between gears, this may be taken up without disassembling the parts, it being merely necessary to loosen the nut L and then screw the rod G until properly adjusted. Should there be too great friction between the gears due to contact pressure, this may be relieved by screwing the rod G in the opposite direction.

What I claim as my invention is:

1. In a steering gear comprising a housing, a worm and rock shaft journaled therein with their transverse axes at a fixed distance from each other and a worm gear on said rock shaft movable into and out of contact with said worm by an axial movement of said rock shaft, of adjustment means for said gear comprising a member having a swivel opposite end thrust connecting engagement therewith and a screw-threaded engagement with said housing whereby rotation of said member will adjust said worm gear axially.

2. In a steering gear, an adjustable end thrust bearing for a gear member comprising a member having a swiveled connecting engagement with said gear in axial alignment therewith and provided with a threaded shank, a housing having a threaded bearing for engaging said threaded shank and means for rotatively adjusting said shank in said bearing and for locking the same.

3. In a steering gear, the combination with a gear member of an adjustable end thrust bearing therefor, comprising a threaded rod having an enlarged head engaging a recess in said gear member in axial alignment therewith, a resilient plate in said recess for contacting with said head, a collar for holding said head in said recess, a threaded bearing for engaging said threaded rod and means for locking said rod in said threaded bearing.

4. In a steering gear the combination with a gear member of an adjustable end thrust bearing therefor, comprising a threaded rod having a head engaging a recess in said gear, a resilient plate in said recess contacting with said head, a collar engaging the opposite side of said head having a flange expanded into an annular grove in the wall of said recess to lock the same in position, a threaded bearing for engaging said threaded rod and a lock nut for holding said rod in adjusted position with respect to said bearing.

5. In a steering gear, the combination with a housing, a worm and a worm gear journaled in said housing with their transverse axes in fixed relation to each other, said worm gear having a recess therein, of an adjustable end thrust bearing for said worm wheel comprising a threaded rod having a head engaging the recess in said worm gear, a resilient plate in said recess contacting said head, a collar contacting the opposite side of said head and provided with a flange expanded into an annular groove in the worm of said recess to lock the same in position, a detachable cover for said housing, a threaded bearing on said cover for engaging said threaded rod and a lock nut also engaging said rod and said bearing to hold the same from displacement.

6. In a steering gear, the combination with a housing, a worm and a worm gear journaled in said housing with their transverse axes in fixed relation to each other, said gear having a recess therein, of an adjustable end thrust bearing for said worm gear comprising a threaded rod having a head engaging the recess in said worm gear, a resilient plate in said recess contacting with said head, a collar engaging the opposite side of said head having a flange expanded into an annular groove in the wall of the recess to lock the same in position, a threaded bearing for engaging said threaded rod, a resilient washer longitudinally slidably and non-revolubly engaging said rod and provided with a series of inwardly extending points at the periphery thereof for adjustably engaging a series of notches in said threaded bearing and a lock nut on said rod for engaging said washer whereby end thrust adustment of less than the length of a single thread can be made by rotatively advancing the points of said washer in relation to the notches engaged thereby.

HENRY MARLES.